United States Patent
Miyaji et al.

[11] Patent Number: 5,940,131
[45] Date of Patent: Aug. 17, 1999

[54] METHOD AND APPARATUS FOR CODING MOVING PICTURES

[75] Inventors: Satoshi Miyaji; Shuichi Matsumoto, both of Tokyo, Japan

[73] Assignee: Kokusai Denshin Denwa Co. Ltd., Tokyo, Japan

[21] Appl. No.: 08/766,145

[22] Filed: Dec. 12, 1996

[30] Foreign Application Priority Data

Dec. 15, 1995 [JP] Japan .................................... 7-347073
Dec. 15, 1995 [JP] Japan .................................... 7-347074

[51] Int. Cl.$^6$ ...................................................... H04N 7/32
[52] U.S. Cl. ........................................... 348/416; 348/699
[58] Field of Search ..................................... 348/416, 699, 348/700, 402, 401, 400, 415, 409, 390, 384; H04N 7/137

[56] References Cited

U.S. PATENT DOCUMENTS

5,459,517 10/1995 Kunitake et al. ........................ 348/416
5,661,524 8/1997 Murdock et al. ........................ 348/416

Primary Examiner—Bryan Tung
Attorney, Agent, or Firm—Nikaido Marmelstein Murray & Oram LLP

[57] ABSTRACT

A method for coding moving pictures using motion compensation for prediction has a step of producing motion vectors for a macroblock in a previous frame, the macroblock corresponding to a macroblock to be coded in a current frame, a step of motion-compensating the macroblock in the previous frame by using the produced motion vector to generate a motion compensated macroblock, a step of calculating a prediction error from the motion compensated macroblock and the macroblock to be coded in the current frame, a step of deciding whether the macroblock to be coded in the current frame is a significant macroblock or a non-significant macroblock by comparing the calculated prediction error with a threshold value, a step of coding the macroblock to be coded in the current frame when the macroblock is decided as the significant macroblock, and a step of transmitting only the produced motion vector when the macroblock is decided as the non-significant macroblock. Particularly, the produced and transmitted motion vector is selected to one with the minimum length within a range in which the macroblock to be coded is decided as the non-significant macroblock.

32 Claims, 9 Drawing Sheets

T1–T4 : SUMS OF ABSOLUTE DIFFERENTIAL
VALUES IN RESPECTIVE BLOCKS

IF max (T1,T2,T3,T4) < Th ← NON-SIGNIFICANT MACROBLOCK
IF max (T1,T2,T3,T4) ≥ Th ← SIGNIFICANT MACROBLOCK

METHOD AND APPARATUS FOR CODING MOVING PICTURES

FIELD OF THE INVENTION

The present invention relates to a method and apparatus for coding moving pictures using motion compensation for prediction. Particularly, the present invention relates to a moving picture coding method and apparatus which are effective for a low bit rate transmission, and to a moving picture coding method with a variable frame rate.

DESCRIPTION OF THE RELATED ART

In a conventional moving picture coding apparatus using a block-matching method, in order to decrease the transmission entropy, each of macroblocks to be coded is decided whether it is a significant macroblock or a non-significant macroblock and then only the significant macroblocks are coded.

In other words, the conventional moving picture coding apparatus obtains a difference between the macroblock to be coded in the current frame and the motion compensated macroblock in the previous frame, and then decides the macroblock with the difference lower than a certain threshold value as a non-significant macroblock. For the non-significant macroblock, only a motion vector is transmitted. If the non-significant macroblock has a motion vector of zero (static macroblock), coding will never be executed.

According to the above-mentioned conventional apparatus, the block-matching method is adopted, in which a macroblock namely a motion vector in the previous frame with the smallest difference (distortion) between the macroblock to be coded in the current frame and the motion compensated macroblock in the previous frame is detected, and the motion compensation is carried out by using the detected motion vector. Thus, following problems may be occurred.

If the above-mentioned decision of the significant macroblock is executed in a system wherein a motion vector is detected by finding a macroblock with the smallest difference (distortion) in a reference picture, a motion vector having an unnecessary large length may be transmitted for the non-significant macroblock. In other words, since only the motion vector is transmitted for the non-significant macroblock, a large motion vector may be transmitted even if the motion compensation can be sufficiently executed by means of a small motion vector or even if the distortion will not be so much increased without motion compensation. As a result, wasteful information may be transmitted.

In a conventional variable frame rate moving picture coding apparatus, a variable frame skip number is controlled based upon an actually coded amount of the current frame. Namely, a target amount of bits for coding with respect to the current frame is first detected from the coded amount of the previous frame, the quantization step size is determined depending upon the detected target amount of bits for coding, and then the current frame is coded using the determined quantization step size. After actually coding the current frame as mentioned above, the frame skip number will be determined, before coding of the next frame, depending upon the coded amount stored in a buffer so that the transmission can be completed with a given bit rate.

According to the above-mentioned conventional apparatus, the frame skip number is varied to cancel a possible deviation between the target amount of bits derived from the coded result in the previous frame and the bit number necessary for actually coding the current frame so as to control the frame rate in the following frames. Therefore, following problems may be occurred.

Since the variation of the generated entropy in each frame is used for quantization control as much as possible and the frame skip number is varied depending upon only the deviation with respect to the target amount of bits derived from the coded result in the previous frame, the frame rate is secondarily controlled after the quantization. Thus, desired frame rate control which fully corresponds to the picture characteristics cannot be expected. As a result, if it is a large coded amount in the current frame, the frame skip size will be automatically increased and thus the quantization will be made with large step. This causes not only the picture quality to deteriorate but also unnatural motion picture such as a time-lapse picture to appear when the motion amount between the previous and current frames is large due to quick movement.

SUMMARY OF THE INVENTION

It is therefore an object of the present invention to provide a method and apparatus for coding moving pictures using motion compensation for prediction, whereby the transmission entropy can be reduced while the picture quality is prevented from deteriorating.

Another object of the present invention is to provide a moving picture coding method with a variable frame rate, whereby a moving picture with subjectively smooth motion can be obtained while the picture quality is prevented from deteriorating.

The present invention provides a method for coding moving pictures using motion compensation for prediction. This method has a step of producing motion vectors for a macroblock in a previous frame, which macroblock corresponds to a macroblock to be coded in a current frame, a step of motion-compensating the macroblock in the previous frame by using the produced motion vector to generate a motion compensated macroblock, a step of calculating a prediction error from the motion compensated macroblock and the macroblock to be coded in the current frame, a step of deciding whether the macroblock to be coded in the current frame is a significant macroblock or a non-significant macroblock by comparing the calculated prediction error with a threshold value, a step of coding the macroblock to be coded in the current frame when the macroblock is decided as the significant macroblock, and a step of transmitting only the produced motion vector when the macroblock is decided as the non-significant macroblock. Particularly, according to the present invention, the produced and transmitted motion vector is selected to one with the minimum length within a range in which the macroblock to be coded is decided as the non-significant macroblock.

Only a motion vector is transmitted with respect to a non-significant macroblock and also this motion vector is selected to one with the minimum length within a range in which the macroblock is decided as the non-significant macroblock. Thus, generated entropy of the motion vectors can be reduced.

It is preferred that the step of calculating a prediction error includes a step of calculating the difference between the motion compensated macroblock and the macroblock to be coded in the current frame.

Also, it is preferred that the deciding step includes a step of deciding the macroblock to be coded in the current frame as a significant macroblock when the calculated prediction error is greater than or equal to the threshold value, and as a non-significant macroblock when the calculated prediction error is smaller than the threshold value.

The deciding step may include a step of dividing the macroblock to be coded in the current frame into quartered blocks and the motion compensated macroblock in the previous frame into quartered blocks, a step of calculating absolute differential values between the quartered blocks of the macroblock to be coded and of the motion compensated macroblock, a step of calculating sums the calculated differential values in the respective quartered blocks, a step of comparing the maximum value of the calculated sums with the threshold value, and a step of deciding the macroblock to be coded in the current frame as a significant macroblock when the maximum value is greater than or equal to the threshold value, and as a non-significant macroblock when the maximum value is smaller than the threshold value.

It is particularly preferred that step of producing motion vectors includes a step of producing motion vectors sequentially from one with the minimum length to one with an equal or larger length, and that the step of motion-compensating, the step of calculating a prediction error and the deciding step are carried out at every time the motion vector is produced.

The method may further include a step of determining the threshold value depending upon a function with a parameter of a length of the produced motion vector. In this case, preferably, the function may be decreased in response to increasing of the length of the produced motion vector, or the function may be decreased in response to increasing of the length of the produced motion vector and saturated when the length of the produced motion vector exceeds a certain value. Thus, it will tend to be decided as the non-significant macroblock in case of a smaller motion vector.

The present invention also provides an apparatus for coding moving pictures using motion compensation for prediction. The apparatus has a motion vector production unit for producing motion vectors for a macroblock in a previous frame, which macroblock corresponds to a macroblock to be coded in a current frame, a motion compensation unit for motion-compensating the macroblock in the previous frame by using the produced motion vector to generate a motion compensated macroblock a calculation unit for calculating a prediction error from the motion compensated macroblock and the macroblock to be coded in the current frame, a decision unit for deciding whether the macroblock to be coded in the current frame is a significant macroblock or a non-significant macroblock by comparing the calculated prediction error with a threshold value, a unit for coding the macroblock to be coded in the current frame when the macroblock is decided as the significant macroblock, and a unit for transmitting only the produced motion vector when the macroblock is decided as the non-significant macroblock. Particularly, according to the present invention, the produced and transmitted motion vector is selected to one with the minimum length within a range in which the macroblock to be coded is decided as the non-significant macroblock.

Only a motion vector is transmitted with respect to a non-significant macroblock and also this motion vector is selected to one with the minimum length within a range in which the macroblock is decided as the non-significant macroblock. Thus, generated entropy of the motion vectors can be reduced.

It is preferred that the calculation unit includes a unit for calculating the difference between the motion compensated macroblock and the macroblock to be coded in the current frame.

It is also preferred that the decision unit includes a unit for deciding the macroblock to be coded in the current frame as a significant macroblock when the calculated prediction error is greater than or equal to the threshold value, and as a non-significant macroblock when the calculated prediction error is smaller than the threshold value.

The decision unit may include a unit for dividing the macroblock to be coded in the current frame into quartered blocks and the motion compensated macroblock in the previous frame into quartered blocks, a unit for calculating absolute differential values between the quartered blocks of the macroblock to be coded and of the motion compensated macroblock, a unit for calculating sums the calculated differential values in the respective quartered blocks, a unit for comparing the maximum value of the calculated sums with the threshold value, and a unit for deciding the macroblock to be coded in the current frame as a significant macroblock when the maximum value is greater than or equal to the threshold value, and as a non-significant macroblock when the maximum value is smaller than the threshold value.

It is particularly preferred that the motion vectors production unit includes a unit for producing motion vectors sequentially from one with the minimum length to one with an equal or larger length, and that the motion compensation unit, the calculation unit and the decision unit carry out their operations at every time the motion vector is produced.

The apparatus may further include a unit for determining the threshold value depending upon a function with a parameter of a length of the produced motion vector. In this case, preferably the function may be decreased in response to increasing of the length of the produced motion vector, or the function may be decreased in response to increasing of the length of the produced motion vector and saturated when the length of the produced motion vector exceeds a certain value.

The present invention further provides a method for coding moving pictures with a variable frame rate using motion compensation for prediction. The method has a step of motion-compensating a macroblock in a previous frame by using a motion vector to generate a motion compensated macroblock, which macroblock corresponds to a macroblock to be coded in a current frame, a step of calculating a prediction error from the motion compensated macroblock and the macroblock to be coded in the current frame, a step of deciding whether the macroblock to be coded in the current frame is a significant macroblock or a non-significant macroblock by comparing the calculated prediction error with a threshold value, a step of coding the macroblock to be coded in the current frame when the macroblock is decided as the significant macroblock, and a step of transmitting only the produced motion vector when the macroblock is decided as the non-significant macroblock. According to the present invention, the method further includes a step of calculating a rate of the significant macroblocks occupying the current frame, and a step of determining a frame skip number in accordance with the calculated rate before coding.

Since the frame skip number is determined before coding the frame to be processed, it is possible to obtain a frame skip number which effectively reflects specific characteristics of the picture. Therefore, the entropy of the picture can be previously predicted so as to control the frame rate resulting that a variable frame rate picture coding with keeping a constant picture quality can be expected. Also, since the frame skip number is controlled in accordance with the rate of the significant macroblocks occupying the current frame, the picture quality can be kept at a constant level.

It is preferred that the step of calculating a prediction error includes a step of calculating the difference between the motion compensated macroblock and the macroblock to be coded in the current frame.

It is also preferred that the deciding step includes a step of deciding the macroblock to be coded in the current frame as a significant macroblock when the calculated prediction error is greater than or equal to the threshold value, and as a non-significant macroblock when the calculated prediction error is smaller than the threshold value.

The deciding step may include a step of dividing the macroblock to be coded in the current frame into quartered blocks and the motion compensated macroblock in the previous frame into quartered blocks, a step of calculating absolute differential values between the quartered blocks of the macroblock to be coded and of the motion compensated macroblock, a step of calculating sums the calculated differential values in the respective quartered blocks, a step of comparing the maximum value of the calculated sums with the threshold value, and a step of deciding the macroblock to be coded in the current frame as a significant macroblock when the maximum value is greater than or equal to the threshold value, and as a non-significant macroblock when the maximum value is smaller than the threshold value.

Preferably, the step of determining a frame skip number includes a step of determining the frame skip number by using a function which is increased in response to increasing of the rate of the significant macroblocks occupying the current frame, or the step of determining a frame skip number includes a step of determining the frame skip number by using a function which is increased in response to increasing of the rate of the significant macroblocks occupying the current frame and saturated when the rate exceeds a certain value.

The frame skip number is controlled to increase depending upon the increasing of the significant macroblock rate to the irreducible minimum of a demand so as to keep a predetermined picture quality. However, the frame skip number is controlled to saturate even when the significant macroblock rate is keep increasing because excess increasing of the frame skip number will lower the efficiency of decreasing the transmission entropy by means of motion compensation.

Furthermore, according to the present invention, the method further has a step of obtaining a length of the motion vector, and a step of determining a frame skip number in accordance with the obtained length of the motion vector before coding. Since the motion vector length information is utilized for controlling the frame rate, a picture with subjectively smooth motion can be obtained.

Preferably, the step of determining a frame skip number includes a step of determining the frame skip number by using a function which is decreased in response to increasing of the length of the motion vector. When the motion vector scalar length of the significant macroblock is large, the frame skip number is controlled to slightly decrease. This is because if the frame skip number is large in this case, a picture with subjectively unnatural motion will be presented.

It is preferred that the method further has a step of obtaining a generated entropy before coding the current frame, and a step of determining a frame skip number in accordance with the obtained length of the motion vector and the obtained generated entropy before coding. In this case, the step of determining a frame skip number may include a step of determining the frame skip number by using a function which is increased in response to increasing of the generated entropy before coding. If the generated entropy before coding is large, the frame skip number is controlled to slightly increase so as to decrease the generated entropy for preventing an output buffer from overflowing.

It is also preferred that the method further has a step of determining a quantization step size in accordance with the determined frame skip number. In this case, the step of determining a quantization step size may include a step of determining a quantization step size by using a function which decreases the step size in response to increasing of the frame skip number. If the frame skip number is large, since the transmission line has enough capacity, a relatively small quantization step size is selected. Contrary to this, if the frame skip number is small, a relatively large quantization step size is selected.

Further objects and advantages of the present invention will be apparent from the following description of the preferred embodiments of the invention as illustrated in the accompanying drawings.

BRIEF DESCRIPTION OF THE DRAWINGS

FIG. 1 which is constituted by combining FIGS. 1A and 1B schematically shows a block diagram of a preferred embodiment of a moving picture coding apparatus according to the present invention;

FIG. 2 which is constituted by combining FIGS. 2A, 2B and 2C shows a flow chart illustrating a principal operation of the embodiment shown in FIG. 1;

DESCRIPTION OF THE PREFERRED EMBODIMENTS

Figures 1, 1A:
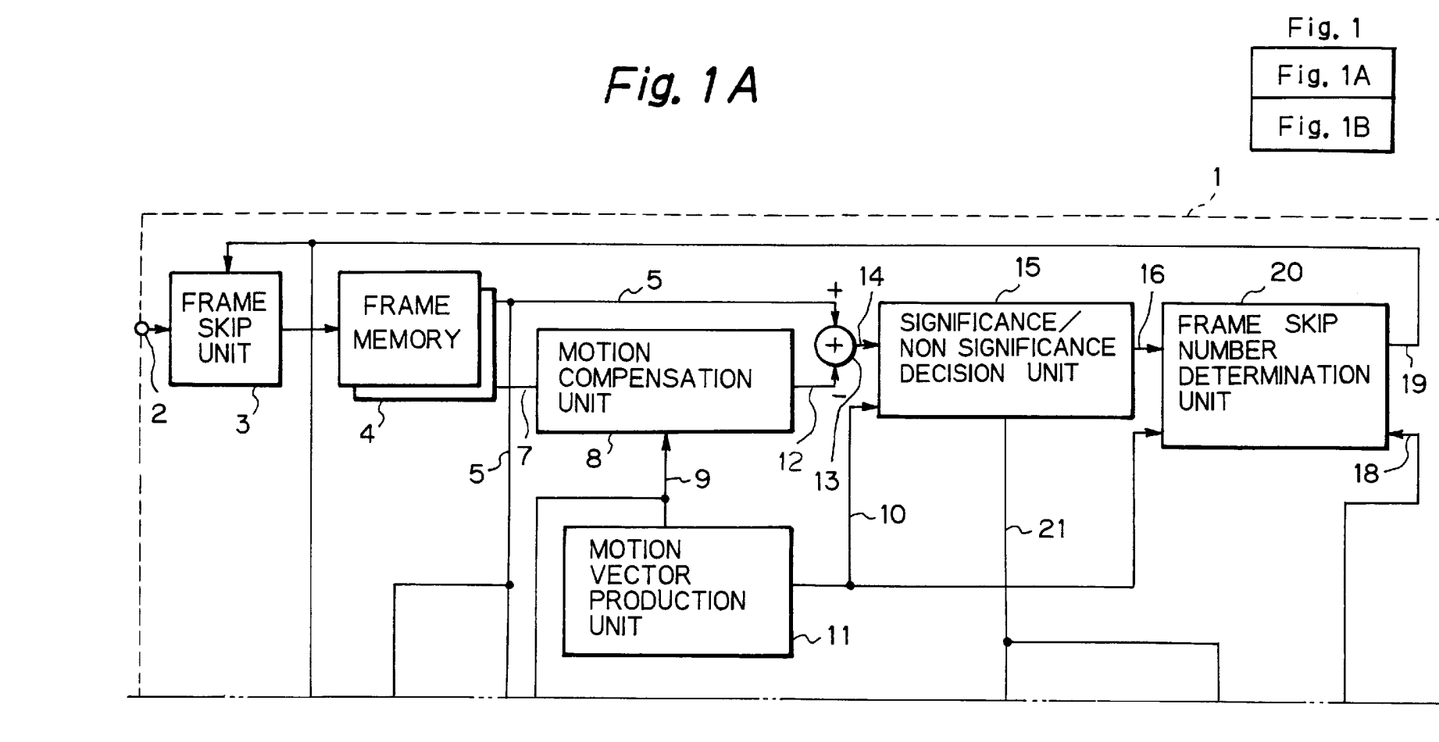
Figure 1B:
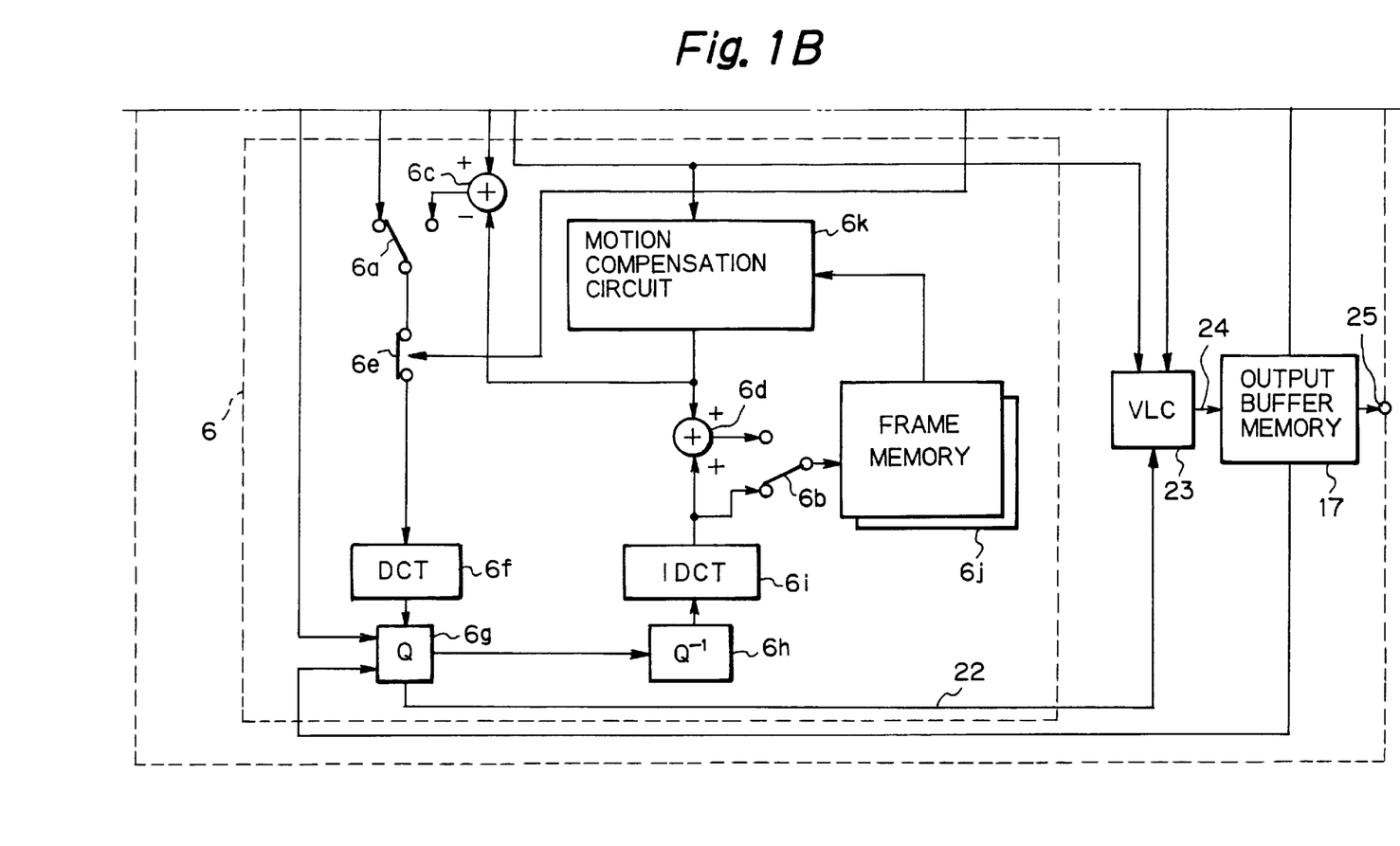

In FIG. 1 which schematically shows a preferred embodiment according to the present invention, reference numeral 1 denotes the whole structure of a variable frame rate moving picture coding apparatus. This coding apparatus 1 includes a video signal input port 2, a frame skip unit 3 connected to the input port 2 to conduct the frame skip operation with respect to the input video signal, a frame memory 4 connected to the frame skip unit 3 to store the input and frame-skipped video signals of at least previous and current frames, and a coding engine unit 6 receiving video signals 5 of the macroblock to be coded in the current frame (macroblock to be processed) provided from the frame memory 4.

The above-mentioned coding engine unit 6, a motion compensation unit 8 and a subtraction unit 13 are connected to the frame memory 4. The motion compensation unit 8, the coding engine unit 6, a VLC (Variable Length Coding) unit 23, a macroblock-significance/non-significance decision unit 15 and a frame skip number determination unit 20 are connected to a motion vector production unit 11 which sequentially produces motion vectors in increasing order of scalar length as will be described later and outputs their motion vector information 9 and scalar length information 10.

The video signals 7 of each macroblock in the previous frame provided from the frame memory 4 are applied to the motion compensation unit 8. To the subtraction unit 13, the video signals 5 of the macroblock to be processed in the current frame provided from the frame memory 4 which is connected to the plus input terminal of this subtraction unit 13 and the video signals 12 of the motion compensated macroblock in the previous frame provided from the motion compensation unit 8 which is connected to the minus input terminal of this subtraction unit 13 are applied.

The output terminal of the subtraction unit 13 is connected to the macroblock-significance/non-significance decision unit 15. Thus, information indicating the difference between the above macroblocks 14 calculated by the subtraction unit 13 is applied to this decision unit 15. Also to this decision unit 15, the scalar length information 10 is applied from the motion vector production unit 11.

The output terminal of the decision unit 15 is connected to the frame skip number determination unit 20. This determination unit 20 is also connected to an output buffer memory 17 and to the frame skip unit 3. Thus, the determination unit 20 receives significant macroblock rate information 16 from the decision unit 15, the scalar length information 10 from the motion vector production unit 11 and the generated entropy before coding 18 from the output buffer memory 17, and produces a frame skip number information 19. This frame skip number information 19 is applied to the frame skip unit 3 and to the coding engine unit 6.

The VLC unit 23 is connected to the decision unit 15, the coding engine unit 6 and the motion vector production unit 11 to receive macroblock significance information 21, quantization information 22 and motion vector information 9, respectively, and executes the coding. The VLC unit 23 is also connected to the input terminal of the output buffer memory 17 to provide coded output 24. The output terminal of the buffer 17 is connected to a coded signal output port 25.

The coding engine unit 6 has the similar structure as that of the known coder except that this unit 6 has a switch 6e which is on/off controlled by significance/non-significance information provided from the decision unit 15. The operation of this switch 6e will be described later. The coding engine unit 6 includes mode switches 6a and 6b for switching depending upon whether the coding mode is INTRA or INTER mode, a subtracter 6c, an adder 6d, the above-mentioned switch 6e, a DCT (Discrete Cosine Transform) circuit 6f, a Q (Quantization) circuit 6g, a $Q^{-1}$ (Inverse Quantization) circuit 6h, an IDCT (Inverse Discrete Cosine Transform) circuit 6i, a frame memory 6j and a motion compensation circuit 6k.

Figures 2, 2A:
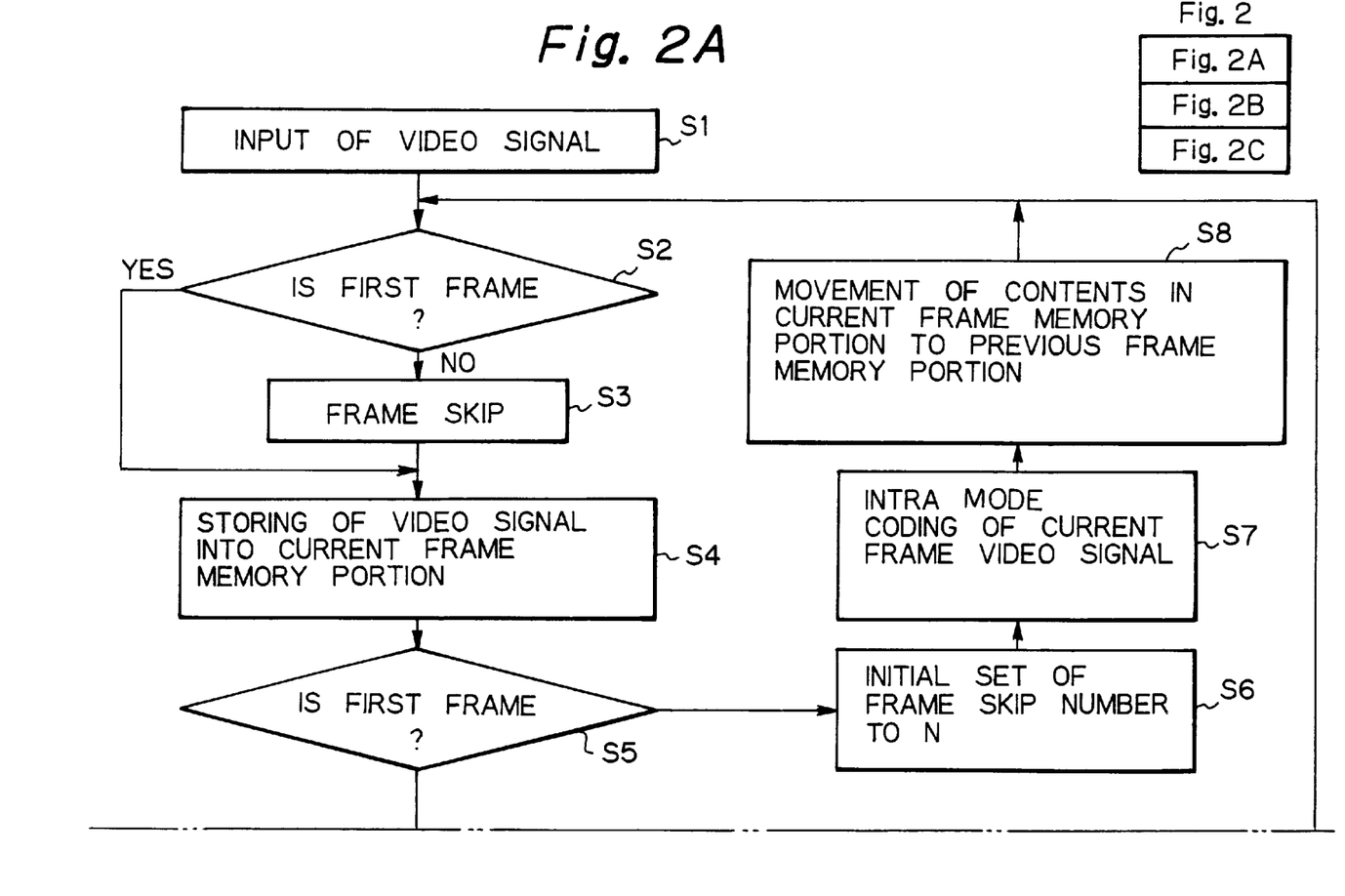
Figure 2B:
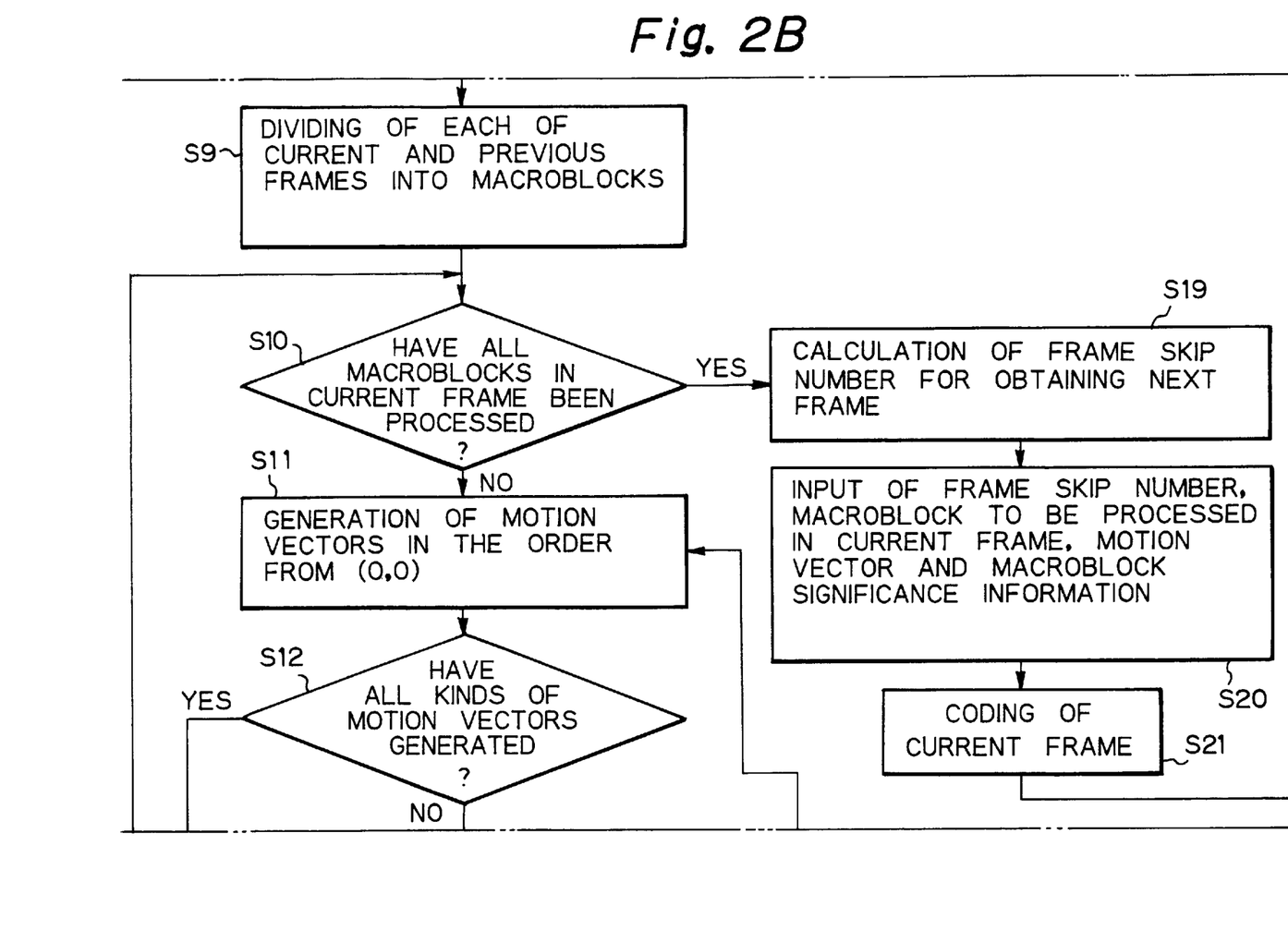
Figure 2C:
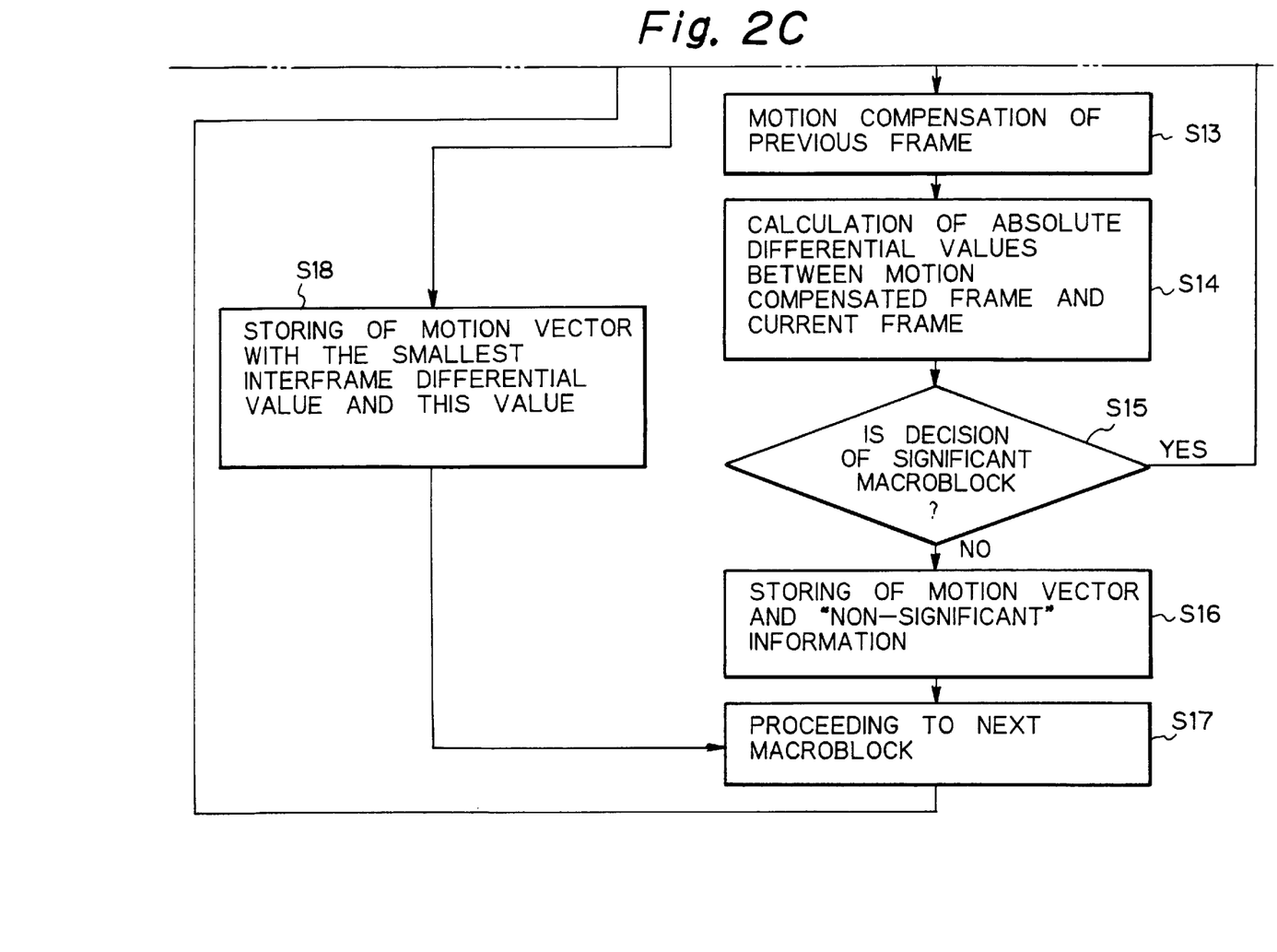

Referring to FIG. 2 which illustrates a principal operation of the coding apparatus 1, the operation of this apparatus will be described in detail.

When video signals or picture signals are applied to the input port 2 (step S1), it is judged whether the frame of these video signals is a first frame or not (step S2). If it is the first frame, the process at the step S3 is jumped over so that no frame skip process is executed in the frame skip unit 3, and the video signals are stored in a current frame memory portion of the frame memory 4 (step S4). At step S5, a judgment whether the frame of the video signals is the first frame or not is executed again.

If it is the first frame, the frame skip number 19 to be output from the frame skip number determination unit 20 is set to an initial value N (N is a natural number) at step S6. Then, the video signals are applied to the coding engine unit 6. At this unit 6, the applied current frame video signals are coded by the INTRA mode (step S7). Then, the coded signals are transformed into a bit stream at the VLC unit 23, and thereafter the bit stream is output from the coded signal output port 25 via the output buffer memory 17. Then, the contents stored in the current frame memory portion of the frame memory 4 are moved into a previous frame memory portion thereof (step S8), and the process is returned to the step S2.

After the above-mentioned processes, because it is not the first frame, the frame skip process of the input video signals in accordance with the frame skip number 19 is executed at the frame skip unit 3 (step S3). The frame-skipped video signals are then stored in the current frame memory portion of the frame memory 4 (step S4). After that, each of the current and previous frames is divided into a predetermined number of macroblocks at step S9.

At the next step S10, it is judged whether all the macroblocks in the current frame have been processed or not. If not yet, motion vectors are generated from the motion vector production unit 11 (step S11). These motion vectors are sequentially generated from the zero vector (0,0) towards various directions. The scalar length of the generated motion vectors is maintained or stepwise increased.

Figure 3:
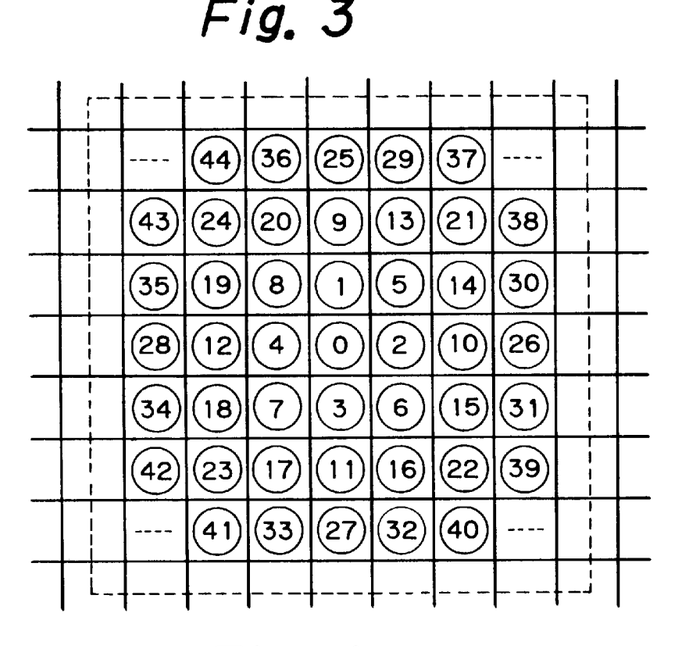
FIG. 3 illustrates the operation of a motion vector production unit shown in FIG. 1.

FIG. 3 illustrates the operation of the motion vector production unit 11. Each block shown in FIG. 3 indicates the minimum unit, for example one fourth of a pixel, of the motion vector. The number enclosed with a circle represents the order of generating the motion vectors. Namely, ① the zero vector (0,0) is first generated, and then ② (0,1), ③ (1,0), ④ (0,-1), ⑤ (-1,0), ⑥ (1,1) . . . are sequentially generated in the order of the encircled number with maintaining or increasing (without decreasing) their scalar lengths and with changing their directions.

The generated motion vectors are applied to the motion compensation unit 8, the coding engine unit 6 and the VLC unit 23 as the motion vector information 9. The scalar length information 10 of the generated motion vector is applied to the macroblock-significance/non-significance decision unit 15 and to the frame skip number determination unit 20.

Then, it is judged whether all kinds of the motion vectors have been already generated at the motion vector production unit 11 or not (step S12). If not yet generated, the motion compensation process with respect to this macroblock is carried out at the motion compensation unit 8 (step S13). Namely, at the step S13, a macroblock which is obtained by motion-compensating the macroblock to be processed in the previous frame by means of the motion vector information 9 provided from the motion vector production unit 11 is derived from the frame memory 4, and the derived macroblock is output as a motion compensated macroblock 12.

Thereafter, the macroblock to be processed 5 in the current frame and the motion compensated macroblock 12 are applied to the subtract unit 13, and thus an absolute differential value (distortion) 14 of each pixel between these macroblocks is calculated (step S14). The calculated absolute differential values are applied to the macroblock-significance/non-significance decision unit 15. The decision unit 15 decides whether this macroblock is the significant macroblock or the non-significant macroblock (step S15).

Figure 4:
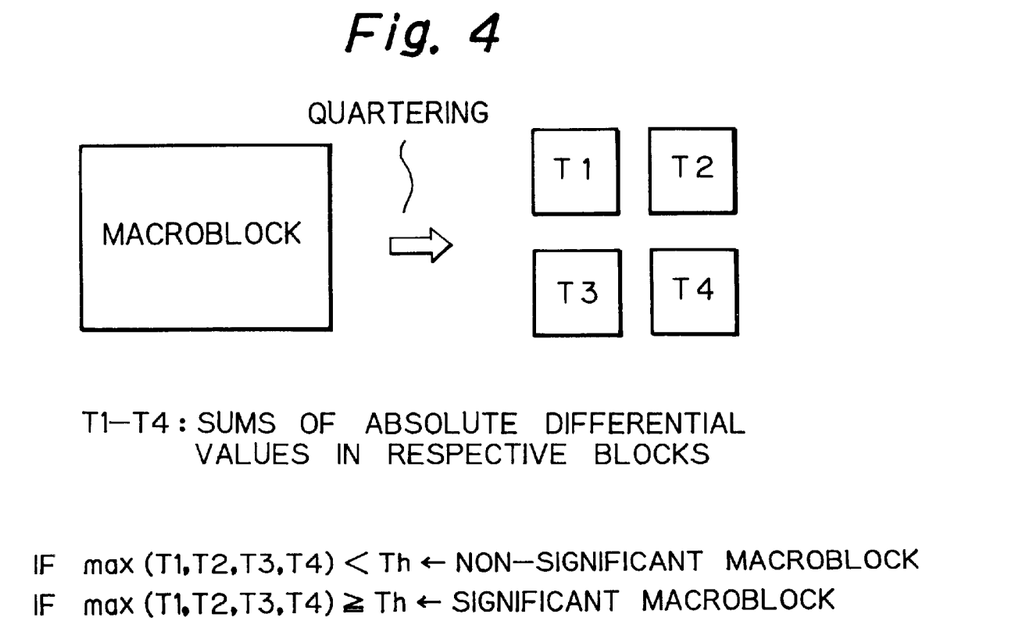
FIG. 4 illustrates the operation of a macroblock-significance/non-significance decision unit shown in FIG. 1.

FIG. 4 schematically illustrates the operation of the macroblock-significance/non-significance decision unit 15. As shown in this figure, a macroblock is quartered and then the sums of the absolute differential values in the respective quartered blocks are calculated. If the calculated four sums are indicated as T1, T2, T3 and T4, the maximum value of them max(T1,T2,T3,T4) is compared with a threshold value Th. Then, if max(T1,T2,T3,T4)≧Th, it is judged as the significant macroblock. Contrary to this, if max(T1,T2,T3,T4)<Th, it is judged as the non-significant macroblock.

Figure 5:
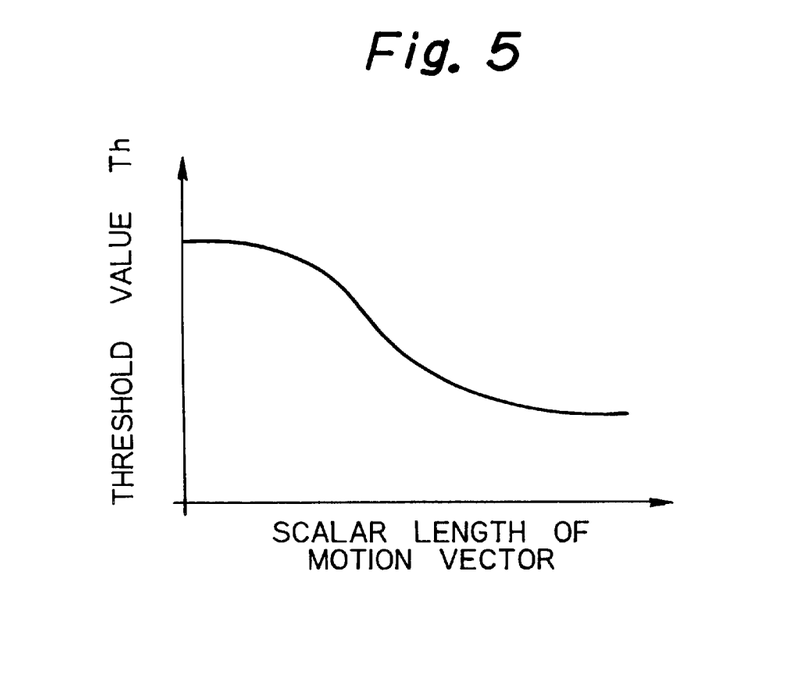
FIG. 5 illustrates characteristics of a threshold for deciding macroblock-significance.

The threshold value Th with a characteristics curve such as an example indicated in FIG. 5 will be determined by means of a function which includes, as a parameter, the scalar length of the motion vector. This function is not limited to the specific characteristics curve illustrated in FIG. 5, but may be any characteristics curve so far as the threshold value is large at a short scalar length region, then decreases in response to increasing of the scalar length, and saturates after the scalar length exceeds a certain value. By using a threshold value with such characteristics, it will tend to be decided as the non-significant macroblock in case of a smaller motion vector.

If it is decided as the non-significant macroblock, the motion vector and the "non-significant" information of this macroblock are stored (step S16), and then the process proceeds to the next macroblock (step S17). Thus, the processes at the steps S10–S18 are repeated. If contrarily it is decided as the significant macroblock, the process returns to the step S11 wherein a motion vector of the next order is produced, and then the processes at the steps S12–S15 are repeated.

If it is judged that all kinds of the motion vectors have been already generated at the motion vector production unit 11 at the step S12, this macroblock will be considered as the significant macroblock because no decision of non-significant macroblock is provided with respect to all the motion vectors. In this case, the motion vector with the smallest interframe differential value and this differential value are stored (step S18), and then the process proceeds to the next macroblock (step S17). Thereafter, the processes at the steps S10–S18 are repeated.

As described above, the decision of significance/non-significance with respect to the respective macroblocks in the current frame is carried out for each of the motion vectors provided from the motion vector production unit 11.

If the decision is completed for all the macroblocks in the current frame at the step S10, a frame skip number 19 for obtaining a next frame is calculated at the frame skip number determination unit 20 (step S19). Namely, the determination unit 20 determines this frame skip number 19 by means of a function which includes, as parameter(s), rate information 16 of the number of significant macroblocks contained in the input frame, scalar length information 10 of the motion vectors in the significant macroblock and/or entropy information 18 generated up to now.

Figure 6:
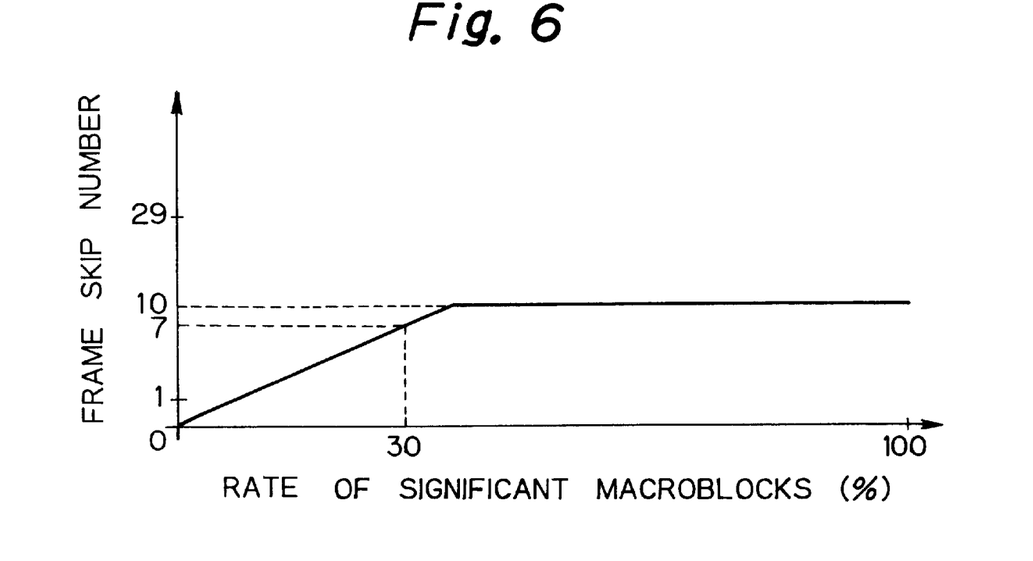
FIG. 6 illustrates a preferred characteristics of a frame skip number versus a rate of significant macroblocks.

FIG. 6 illustrates a preferred characteristics example of a frame skip number versus a rate of significant macroblocks. The frame skip number will be zero when the rate of the significant macroblocks is zero, will increase in response to increasing of the significant macroblock rate, and will saturate after the significant macroblock rate exceeds a certain value. When the rate of the significant macroblocks occupying the current frame is large, it can be presumed that a large amount of information will be necessary for coding this current frame. Thus, the frame skip number is controlled to increase depending upon the increasing of the significant macroblock rate 16 to the irreducible minimum of a demand so as to keep a predetermined picture quality. However, the frame skip number 19 is controlled to saturate even when the significant macroblock rate 16 is keep increasing because excess increasing of the frame skip number will lower the efficiency of decreasing the transmission entropy by means of motion compensation.

It should be noted that the frame skip number indicated in FIG. 6 is mere example and does not intend to limit practical frame skip number of the coding apparatus according to the present invention.

Figure 7:
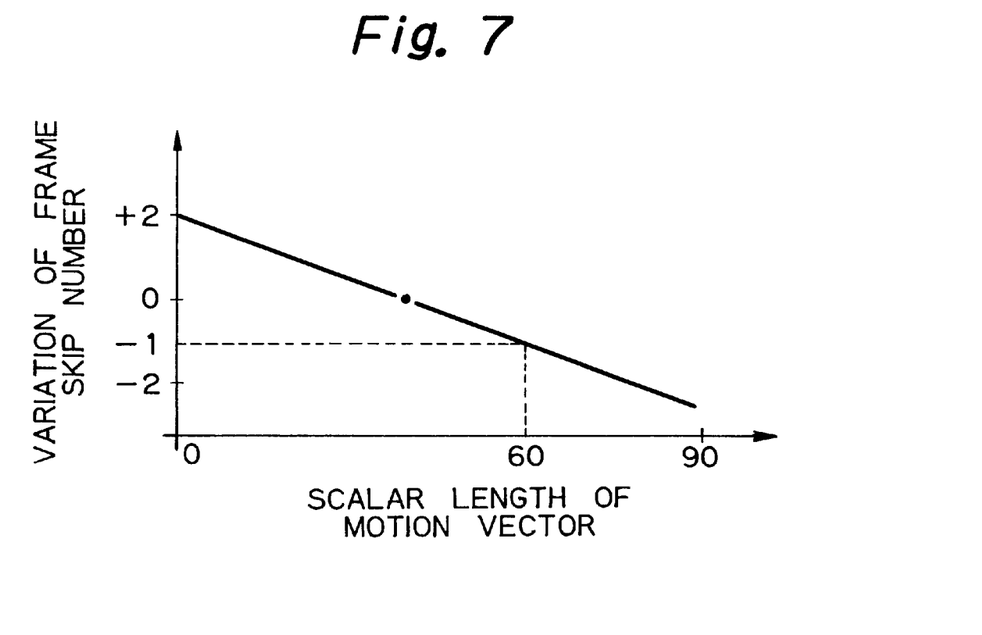
FIG. 7 illustrates a preferred characteristics of a variation of a frame skip number versus a scalar length of a motion vector.

FIG. 7 illustrates a preferred characteristics example of increase or decrease of a frame skip number versus a scalar length of a motion vector. The frame skip number will decrease in response to increasing of the motion vector scalar length. When the motion vector scalar length 10 of the significant macroblock is large, the frame skip number 19 is controlled to slightly decrease. This is because if the frame skip number 19 is large in that case, a picture with subjectively unnatural motion will be presented.

Figure 8:
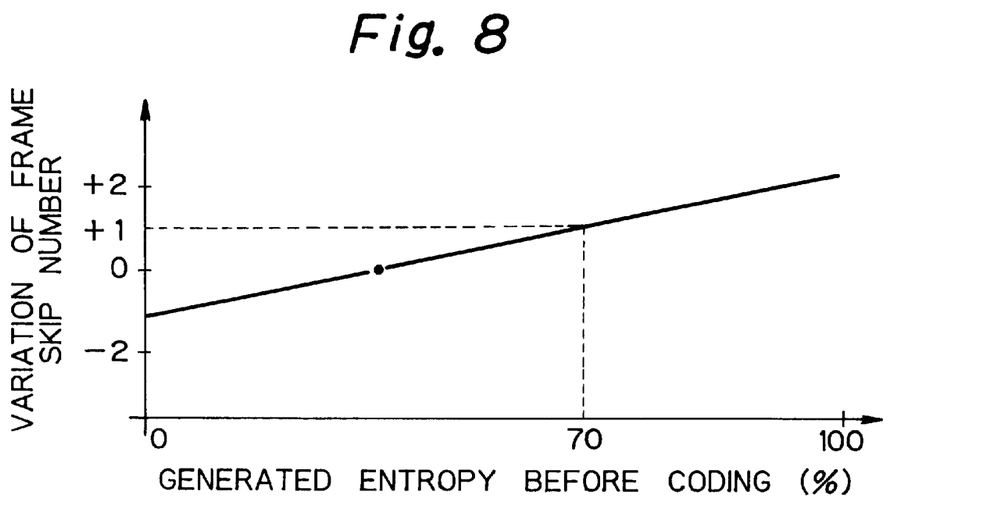
FIG. 8 illustrates a preferred characteristics of a variation of a frame skip number versus generated entropy before coding.

FIG. 8 illustrates a preferred characteristics example of increase or decrease of a frame skip number versus generated entropy before coding (a rate of stored information amount against a capacity of the output buffer memory 17). The frame skip number will increase in response to increasing of the generated entropy before coding. If the generated entropy before coding 18 is large, the frame skip number 19 is controlled to slightly increase so as to decrease the generated entropy for preventing the output buffer 17 from overflowing.

It should be noted that the frame skip numbers indicated in FIGS. 7 and 8 are also mere example and do not intend to limit practical frame skip numbers of the coding apparatus according to the present invention.

The frame skip number may be a function having any one of parameters of the aforementioned significant macroblock rate, the motion vector scalar length of the significant macroblock and the generated entropy before coding, or, in another case, may be a function of all these parameters.

Figure 9:
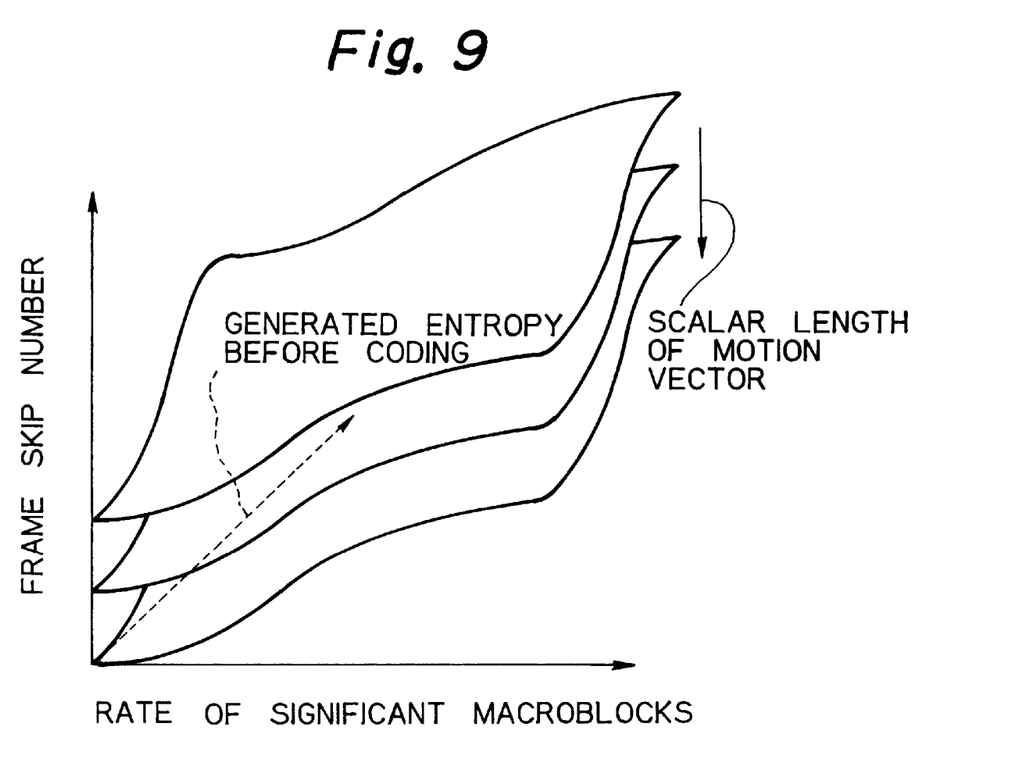
FIG. 9 illustrates a preferred characteristics of a frame skip number indicated in a three-dimension.

FIG. 9 illustrates a preferred characteristics of the frame skip number indicated in a three-dimension in the latter case. As shown in this figure, the frame skip number is controlled to zero when the significant macroblock rate is zero, to increase in response to increasing of the significant macroblock rate, to saturate after the significant macroblock rate exceeds a certain value, to decrease in response to increasing of the motion vector scalar length, and to increase in response to increasing of the generated entropy before coding. As for an example, in case that the significant macroblock rate in the frame to be processed is 30%, the motion vector scalar length is 60, and the generated entropy before coding occupies 70% of the output buffer 17, the frame skip number is 7 from FIG. 6, −1 from FIG. 7 and +1 from FIG. 8. As a result, the final frame skip number will be 7+(−1)+(+1)=7.

After thus determining the frame skip number for obtaining the next frame at the step S19 shown in FIG. 2, the determined frame skip number 19, the macroblock to be processed in the current frame 5, the motion vector information 9 and the macroblock significance information 21 are applied to the coding engine unit 6 (step S20). Also, the motion vector information 9 and the macroblock significance information 21 are applied to the VLC unit 23.

In the coding engine unit 6 shown in FIG. 1, the applied frame skip number 19 is input into the quantization circuit 6g and used therein as a parameter for selecting one of quantizers. If the applied frame skip number 19 is large, since the transmission line has enough capacity, a quantizer with a relatively small quantization step size is selected. Contrary to this, if the applied frame skip number 19 is small, a quantizer with a relatively large quantization step size is selected.

Figure 10:
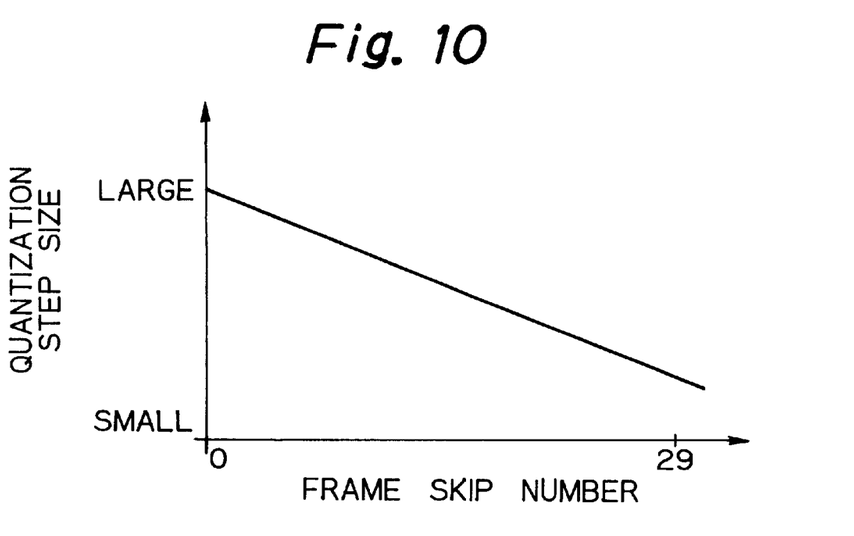
FIG. 10 illustrates a preferred characteristics of a frame skip number versus a quantization step size.

FIG. 10 illustrates a preferred characteristics of the frame skip number versus the quantization step size. As shown in the figure, the quantization step size decreases in response to increasing the frame skip number.

It should be noted that the frame skip number indicated in FIG. 10 is mere example and does not intend to limit practical frame skip number of the coding apparatus according to the present invention.

The macroblock significance information 21 is applied to the switch 6e to control on/off operation of this switch 6e. If the information 21 indicates that the macroblock is significant, the switch 6e turns on to quantize the prediction error in this macroblock. Contrary to this, if the information 21 indicates that the macroblock is non-significant, this switch 6e turns off not to quantize the prediction error in this macroblock. Another operations of this coding engine 6 is well-known and thus explanation thereof is omitted.

The quantized data of the current frame 22 obtained at the coding engine 6 (in case of the significant macroblock), the motion vector information 9, and the macroblock significance information 21 are coded at the VLC unit 23 (step S21). The coded data are temporarily stored in the output buffer 17 and then output to the transmission line from the coded signal output port 25. Thereafter, the same operations as mentioned before are repeated for the next frame.

As mentioned in detail herein before, according to this embodiment, only a motion vector is transmitted with respect to a non-significant macroblock and also this motion vector is selected to one with the minimum scalar length within a range in which the macroblock is judged as the non-significant macroblock. Thus, generated entropy of the motion vectors can be reduced.

Furthermore, according to this embodiment, since the frame skip number is determined before coding the frame to be processed, it is possible to obtain a frame skip number which effectively reflects specific characteristics of the picture. Therefore, the entropy of the picture can be previously predicted so as to control the frame rate resulting that a variable frame rate picture coding with keeping a constant picture quality can be expected. Also, since the motion vector information can be utilized for controlling the frame rate, a picture with subjectively smooth motion can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for coding moving pictures using motion compensation for prediction, said method comprising the steps of:

producing motion vectors for a macroblock in a previous frame, said macroblock corresponding to a macroblock to be coded in a current frame;

motion-compensating said macroblock in the previous frame by using the produced motion vector to generate a motion compensated macroblock;

calculating a prediction error from said motion compensated macroblock and said macroblock to be coded in the current frame;

deciding whether said macroblock to be coded in the current frame is a significant macroblock or a non-significant macroblock by comparing said calculated prediction error with a threshold value;

coding said macroblock to be coded in the current frame when the macroblock is decided as the significant macroblock; and transmitting only said produced motion vector when the macroblock is decided as the non-significant macroblock, wherein said produced and transmitted motion vector is selected to one with the minimum length within a range in which said macroblock to be coded is decided as the non-significant macroblock.

2. The method as claimed in claim 1, wherein said step of calculating a prediction error includes a step of calculating the difference between said motion compensated macroblock and said macroblock to be coded in the current frame.

3. The method as claimed in claim 1, wherein said deciding step includes a step of deciding said macroblock to be coded in the current frame as a significant macroblock when said calculated prediction error is greater than or equal to the threshold value, and as a non-significant macroblock when said calculated prediction error is smaller than the threshold value.

4. The method as claimed in claim 3, wherein said deciding step includes a step of dividing said macroblock to be coded in the current frame into quartered blocks and said motion compensated macroblock in the previous frame into quartered blocks, a step of calculating absolute differential values between the quartered blocks of said macroblock to be coded and of said motion compensated macroblock, a step of calculating sums the calculated differential values in the respective quartered blocks, a step of comparing the maximum value of the calculated sums with the threshold value, and a step of deciding said macroblock to be coded in the current frame as a significant macroblock when said maximum value is greater than or equal to the threshold value, and as a non-significant macroblock when said maximum value is smaller than the threshold value.

5. The method as claimed in claim 1, wherein said step of producing motion vectors includes a step of producing motion vectors sequentially from one with the minimum length to one with an equal or larger length, and wherein said step of motion-compensating, said step of calculating a prediction error and said deciding step are carried out at every time the motion vector is produced.

6. The method as claimed in claim 1, wherein said method further includes a step of determining said threshold value depending upon a function with a parameter of a length of the produced motion vector.

7. The method as claimed in claim 6, wherein said function is a function which is decreased in response to increasing of the length of the produced motion vector.

8. The method as claimed in claim 6, wherein said function is a function which is decreased in response to increasing of the length of the produced motion vector and saturated when the length of the produced motion vector exceeds a certain value.

9. An apparatus for coding moving pictures using motion compensation for prediction, said apparatus comprising:

a motion vector production means for producing motion vectors for a macroblock in a previous frame, said macroblock corresponding to a macroblock to be coded in a current frame;

a motion compensation means for motion-compensating said macroblock in the previous frame by using the produced motion vector to generate a motion compensated macroblock;

a calculation means for calculating a prediction error from said motion compensated macroblock and said macroblock to be coded in the current frame;

a decision means for deciding whether said macroblock to be coded in the current frame is a significant macroblock or a non-significant macroblock by comparing said calculated prediction error with a threshold value;

means for coding said macroblock to be coded in the current frame when the macroblock is decided as the significant macroblock; and means for transmitting only said produced motion vector when the macroblock is decided as the non-significant macroblock, wherein said produced and transmitted motion vector is selected to one with the minimum length within a range in which said macroblock to be coded is decided as the non-significant macroblock.

10. The apparatus as claimed in claim 9, wherein said calculation means includes means for calculating the difference between said motion compensated macroblock and said macroblock to be coded in the current frame.

11. The apparatus as claimed in claim 9, wherein said decision means includes means for deciding said macroblock to be coded in the current frame as a significant macroblock when said calculated prediction error is greater than or equal to the threshold value, and as a non-significant macroblock when said calculated prediction error is smaller than the threshold value.

12. The apparatus as claimed in claim 11, wherein said decision means includes means for dividing said macroblock to be coded in the current frame into quartered blocks and said motion compensated macroblock in the previous frame into quartered blocks, means for calculating absolute differential values between the quartered blocks of said macroblock to be coded and of said motion compensated macroblock, means for calculating sums the calculated differential values in the respective quartered blocks, means for comparing the maximum value of the calculated sums with the threshold value, and means for deciding said macroblock to be coded in the current frame as a significant macroblock when said maximum value is greater than or equal to the threshold value, and as a non-significant macroblock when said maximum value is smaller than the threshold value.

13. The apparatus as claimed in claim 9, wherein said motion vectors production means includes means for producing motion vectors sequentially from one with the minimum length to one with an equal or larger length, and wherein said motion compensation means, said calculation means and said decision means carry out their operations at every time the motion vector is produced.

14. The apparatus as claimed in claim 9, wherein said apparatus further includes means for determining said threshold value depending upon a function with a parameter of a length of the produced motion vector.

15. The apparatus as claimed in claim 14, wherein said function is a function which is decreased in response to increasing of the length of the produced motion vector.

16. The apparatus as claimed in claim 14, wherein said function is a function which is decreased in response to increasing of the length of the produced motion vector and saturated when the length of the produced motion vector exceeds a certain value.

17. A method for coding moving pictures with a variable frame rate using motion compensation for prediction, said method comprising the steps of:

motion-compensating a macroblock in a previous frame by using a motion vector to generate a motion compensated macroblock, said macroblock corresponding to a macroblock to be coded in a current frame;

calculating a prediction error from said motion compensated macroblock and said macroblock to be coded in the current frame;

deciding whether said macroblock to be coded in the current frame is a significant macroblock or a non-significant macroblock by comparing said calculated prediction error with a threshold value;

coding said macroblock to be coded in the current frame when the macroblock is decided as the significant macroblock; and transmitting only said produced motion vector when the macroblock is decided as the non-significant macroblock, wherein said method further comprises a step of calculating a rate of the significant macroblocks occupying the current frame, and a step of determining a frame skip number in accordance with the calculated rate before coding.

18. The method as claimed in claim 17, wherein said step of calculating a prediction error includes a step of calculating the difference between said motion compensated macroblock and said macroblock to be coded in the current frame.

19. The method as claimed in claim 17, wherein said deciding step includes a step of deciding said macroblock to be coded in the current frame as a significant macroblock when said calculated prediction error is greater than or equal to the threshold value, and as a non-significant macroblock when said calculated prediction error is smaller than the threshold value.

20. The method as claimed in claim 19, wherein said deciding step includes a step of dividing said macroblock to be coded in the current frame into quartered blocks and said motion compensated macroblock in the previous frame into quartered blocks, a step of calculating absolute differential values between the quartered blocks of said macroblock to be coded and of said motion compensated macroblock, a step of calculating sums the calculated differential values in the respective quartered blocks, a step of comparing the maximum value of the calculated sums with the threshold value, and a step of deciding said macroblock to be coded in the current frame as a significant macroblock when said maximum value is greater than or equal to the threshold value, and as a non-significant macroblock when said maximum value is smaller than the threshold value.

21. The method as claimed in claim 17, wherein said step of determining a frame skip number includes a step of determining said frame skip number by using a function which is increased in response to increasing of the rate of the significant macroblocks occupying the current frame.

22. The method as claimed in claim 17, wherein said step of determining a frame skip number includes a step of determining said frame skip number by using a function which is increased in response to increasing of the rate of the significant macroblocks occupying the current frame and saturated when the rate exceeds a certain value.

23. The method as claimed in claim 17, wherein said method further comprises a step of obtaining a length of the motion vector, and a step of determining a frame skip number in accordance with the calculated rate and the obtained length of the motion vector before coding.

24. A method for coding moving pictures with a variable frame rate using motion compensation for prediction, said method comprising the steps of:

motion-compensating a macroblock in a previous frame by using a motion vector to generate a motion compensated macroblock, said macroblock corresponding to a macroblock to be coded in a current frame;

calculating a prediction error from said motion compensated macroblock and said macroblock to be coded in the current frame;

deciding whether said macroblock to be coded in the current frame is a significant macroblock or a non-significant macroblock by comparing said calculated prediction error with a threshold value;

coding said macroblock to be coded in the current frame when the macroblock is decided as the significant macroblock; and transmitting only said produced motion vector when the macroblock is decided as the non-significant macroblock, wherein said method further comprises a step of obtaining a length of the motion vector, and a step of determining a frame skip number in accordance with the obtained length of the motion vector before coding.

25. The method as claimed in claim 24, wherein said step of calculating a prediction error includes a step of calculating the difference between said motion compensated macroblock and said macroblock to be coded in the current frame.

26. The method as claimed in claim 24, wherein said deciding step includes a step of deciding said macroblock to be coded in the current frame as a significant macroblock when said calculated prediction error is greater than or equal to the threshold value, and as a non-significant macroblock when said calculated prediction error is smaller than the threshold value.

27. The method as claimed in claim 26, wherein said deciding step includes a step of dividing said macroblock to be coded in the current frame into quartered blocks and said motion compensated macroblock in the previous frame into quartered blocks, a step of calculating absolute differential values between the quartered blocks of said macroblock to be coded and of said motion compensated macroblock, a step of calculating sums the calculated differential values in the respective quartered blocks, a step of comparing the maximum value of the calculated sums with the threshold value, and a step of deciding said macroblock to be coded in the current frame as a significant macroblock when said maximum value is greater than or equal to the threshold value, and as a non-significant macroblock when said maximum value is smaller than the threshold value.

28. The method as claimed in claim 24, wherein said step of determining a frame skip number includes a step of determining said frame skip number by using a function which is decreased in response to increasing of the length of the motion vector.

29. The method as claimed in claim 24, wherein said method further comprises a step of obtaining a generated entropy before coding the current frame, and a step of determining a frame skip number in accordance with the obtained length of the motion vector and the obtained generated entropy before coding.

30. The method as claimed in claim 29, wherein said step of determining a frame skip number includes a step of determining said frame skip number by using a function which is increased in response to increasing of the generated entropy before coding.

31. The method as claimed in claim 24, wherein said method further comprises a step of determining a quantization step size in accordance with the determined frame skip number.

32. The method as claimed in claim 31, wherein said step of determining a quantization step size includes a step of determining a quantization step size by using a function which decreases the step size in response to increasing of the frame skip number.

* * * * *